(12) United States Patent
Christensen et al.

(10) Patent No.: US 12,295,344 B2
(45) Date of Patent: May 13, 2025

(54) MILKING ARRANGEMENT FOR ANIMAL HEALTH CONDITION INDICATION

(71) Applicant: DELAVAL HOLDING AB, Tumba (SE)

(72) Inventors: John M Christensen, Tumba (SE); Claus Dallerup Rasmussen, Tumba (SE); Mikael Højer Hansen, Tumba (SE)

(73) Assignee: DeLaval Holding AB, Tumba (SE)

( * ) Notice: Subject to any disclaimer, the term of this patent is extended or adjusted under 35 U.S.C. 154(b) by 433 days.

(21) Appl. No.: 17/779,419

(22) PCT Filed: Nov. 26, 2020

(86) PCT No.: PCT/SE2020/051134
§ 371 (c)(1),
(2) Date: May 24, 2022

(87) PCT Pub. No.: WO2021/107851
PCT Pub. Date: Jun. 3, 2021

(65) Prior Publication Data
US 2022/0408680 A1    Dec. 29, 2022

(30) Foreign Application Priority Data
Nov. 27, 2019  (SE) .................................. 1951360-5

(51) Int. Cl.
*A01J 5/013*    (2006.01)
(52) U.S. Cl.
CPC ............ *A01J 5/0131* (2013.01); *A01J 5/0132* (2013.01); *A01J 5/0133* (2013.01); *G01N 2333/4713* (2013.01)

(58) Field of Classification Search
CPC ............ G01N 2333/4713; A01J 5/0131; A01J 5/0132; A01J 5/0133; A01J 5/013; A01J 5/007
See application file for complete search history.

(56) References Cited

U.S. PATENT DOCUMENTS

| 4,532,892 A | * | 8/1985 | Kuzara ................ A01K 11/006 119/51.02 |
| 7,172,872 B1 | | 2/2007 | Eckersall et al. |

(Continued)

FOREIGN PATENT DOCUMENTS

| WO | 01/27631 | 4/2011 |
| WO | 2012/163361 | 12/2012 |
| WO | 2018/212707 | 11/2018 |

OTHER PUBLICATIONS

International Search Report for PCT/SE2020/051134, dated Jan. 29, 2021, 4 pp.

(Continued)

*Primary Examiner* — Paul M. West
(74) *Attorney, Agent, or Firm* — NIXON & VANDERHYE (57) ABSTRACT

A milking arrangement comprising a milking machine for milking an animal, wherein the milking arrangement comprises a control unit that is configured to obtain identity of the animal in connection with milking of the animal, obtain a reference point in time of a lactation cycle of the identified animal, determine to take at least one milk sample of the animal, when a predetermined time period has passed from the reference point in time; obtain a Haptoglobin level from the milk sample, compare the obtained Haptoglobin level with a Haptoglobin reference limit, and indicate health condition of the animal, based on the made comparison.

33 Claims, 5 Drawing Sheets

(56) References Cited

U.S. PATENT DOCUMENTS

| | | |
|---|---|---|
| 7,569,338 B1 | 8/2009 | McDonald et al. |
| 2002/0124803 A1 | 9/2002 | Chen et al. |
| 2011/0132264 A1 | 6/2011 | Akerman |
| 2013/0025541 A1* | 1/2013 | Axelson .................. A01J 5/007 119/14.08 |
| 2018/0180632 A1 | 6/2018 | Lehmann et al. |

OTHER PUBLICATIONS

Written Opinion for PCT/SE2020/051134, dated Jan. 29, 2021, 7 pp.
Swedish Search Report for SE Application No. 1951360-5, dated May 18, 2020, 3 pp.

* cited by examiner

MILKING ARRANGEMENT FOR ANIMAL HEALTH CONDITION INDICATION

This application is the U.S. national phase of International Application No. PCT/SE2020/051134 filed Nov. 26, 2020 which designated the U.S. and claims priority to SE 1951360-5 filed Nov. 27, 2019, the entire contents of each of which are hereby incorporated by reference.

TECHNICAL FIELD

This document discloses a milking arrangement. More particularly, a milking arrangement comprising a milking machine for milking an animal, wherein the milking arrangement comprises a control unit as described, for indicating health condition of the animal.

BACKGROUND

On a dairy farm, the health of the animals is essential, as the milk yield of the animals may be affected in case an animal becomes ill. In a worst-case scenario, diseases may spread among the herd, if a sick animal is not identified early in the process; and/or the sick animal/s may have to be put out of production.

There are many ways to discover diseases among the animals. Typically, they all involve either visual inspection by the farmer, and/or some kind of test performed by the farmer on the animals, which result then has to be analysed. This is typically time consuming. The farmer is often occupied with a large number of different tasks on the farm, and sometimes has to completely put aside daily working routines in case of emergencies, e.g. when animals have escaped from a pasture area, or when an animal is calving.

For these reasons, it would be desired to develop a tool for assisting the farmer in surveying the health status of the animals at the farm, which require very little or preferably no interaction at all by the farmer.

SUMMARY

It is therefore an object of this invention to solve at least some of the above problems and indicate health condition of an animal.

According to a first aspect of the invention, this objective is achieved by a milking arrangement comprising a milking machine for milking an animal. The milking arrangement comprises a control unit. The control unit is configured to obtain identity of the animal in connection with milking of the animal. Further, the control unit is configured to obtain a reference point in time of a lactation cycle of the identified animal. The control unit is in addition configured to determine to take at least one milk sample of the animal, when a predetermined time period has passed from the reference point in time. Also, the control unit is configured to obtain a Haptoglobin level from the milk sample. Further, the control unit is configured to compare the obtained Haptoglobin level with a Haptoglobin reference limit. The control unit is configured to indicate health condition of the animal, based on the made comparison.

By determining the Haptoglobin level of an extracted milk sample of the animal, triggered by the predetermined time-period that has passed from the reference point in time, and compare the current Haptoglobin level with the Haptoglobin reference limit, it may be determined whether the current Haptoglobin level is higher than or lower than the Haptoglobin reference limit. A health indication is thereby obtained concerning the animal, which may trigger additional milk sample extraction and biomarker measurements and/or other health related measures such as visual inspection by the farmer, temperature measurement of the animal etc. An unhealthy animal may thereby be identified at an early stage and further health examination and appropriate counter measures may be initiated in order to minimise or at least reduce the suffering of the animal and the negative consequences for the milk yield. Also, or alternatively, the animal may be categorised as healthy when the current Haptoglobin level is lower than the Haptoglobin reference limit. Thereby, the farmer may focus visual inspection and/or other measures at the farm to other animals, having a current Haptoglobin level which is higher than the Haptoglobin reference limit, or presenting deviating/unexpected values.

In an implementation of the milking arrangement according to the first aspect, the control unit may be further configured to iteratively take milk samples of the animal. Also, the control unit may be configured to store the obtained Haptoglobin level of the respective milk sample in a memory of the milking arrangement, associated with a time reference. Furthermore, the control unit may determine a difference between the obtained Haptoglobin level and a previously stored Haptoglobin level. Also, the indication of the health condition may be based on the determined difference.

The iteratively taken milk samples of the animal may be extracted at about the same or at different points in time. By extracting at least two milk samples at about the same time and measuring the Haptoglobin level of both samples independently from each other, a higher validity of the measurement is achieved when the levels correspond with each other/alternatively, an erroneous measurement may be identified.

By extracting at least two milk samples at distinct points in time iteratively, e.g. at every milking event of the animal, once a day, once every second day, once every third day, etc., measure the Haptoglobin level of the samples and store each measured Haptoglobin level value in a database, the historical development of the measured Haptoglobin level of the animal may be studied. The most interesting Haptoglobin level to study may be between the currently measured Haptoglobin level and the latest stored Haptoglobin level of the animal.

The direction and amplitude of any detected difference between these values may form basis for a health analysis of the animal. When the detected difference exceeds a predetermined or configurable trigger limit, a health-related further measure may be triggered such as e.g. visual inspection of the animal by the farmer.

In yet an implementation of the milking arrangement according to the first aspect, or according to any implementation thereof, the control unit may be configured to calculate the Haptoglobin reference limit, based on a value of at least one stored Haptoglobin level.

The Haptoglobin reference limit may be determined individually for each animal based on previously determined and stored Haptoglobin level value/values. The reference limit may be based on an average value of stored Haptoglobin level values or a rolling average of stored Haptoglobin level values. The reference limit may be set to the stored Haptoglobin level value multiplied with e.g. 3.14, or another similar value of about the same magnitude.

In yet an implementation of the milking arrangement according to the first aspect, or according to any implementation thereof, the control unit may be further configured to determine to take a further milk sample of the animal. Further, the control unit may be configured to select a supplementary biomarker, distinct from Haptoglobin. Also, the control unit may be configured to obtain a supplementary biomarker level from the further milk sample of the animal, of the selected supplementary biomarker. In addition, the control unit may be configured to obtain a supplementary biomarker level from the further milk sample of the animal, of the selected supplementary biomarker. Furthermore, the control unit may be configured to compare the obtained supplementary biomarker level with a supplementary biomarker reference limit. Further, the indicated health condition of the animal is based on the made comparison of the supplementary biomarker level and the supplementary biomarker reference limit, and the comparison of the Haptoglobin level with the Haptoglobin reference limit.

By extracting yet a milk sample and determine the supplementary biomarker, distinct from Haptoglobin, the health condition of the animal may be determined with further enhanced precision and reliability by comparing the respective biomarkers with the respective reference limits.

In yet an implementation of the milking arrangement according to the first aspect, or according to any implementation thereof, the control unit may be configured to iteratively take further milk samples of the animal. Also, the control unit may be configured to store the obtained supplementary biomarker level of the respective further milk samples in the memory of the milking arrangement, associated with a time reference. Furthermore, the control unit may also be configured to determine a difference between the obtained supplementary biomarker level and a previously stored supplementary biomarker level. Also, the indication of the health condition may be based on the determined difference.

The iteratively taken milk samples of the animal may be extracted at about the same or at different points in time. By extracting at least two milk samples at about the same time and measuring the supplementary biomarker level of both samples independently from each other, a higher validity of the measurement is achieved when the levels correspond with each other/alternatively, an erroneous measurement may be identified.

In yet an implementation of the milking arrangement according to the first aspect, or according to any implementation thereof, the control unit may be configured to calculate the supplementary biomarker reference limit, based on at least one stored supplementary biomarker level.

The supplementary biomarker reference limit may thereby be determined individually for each animal based on previously determined and stored supplementary biomarker level value/values; e.g. by setting the supplementary biomarker reference limit to about the stored supplementary biomarker level value multiplied with an arbitrary parameter or an average value based on stored values multiplied with an arbitrary parameter.

In yet an implementation of the milking arrangement according to the first aspect, or according to any implementation thereof, the control unit may, when triggered by the obtained Haptoglobin level exceeding the Haptoglobin reference limit, be configured to obtain the supplementary biomarker level. Also, the control unit may be configured to compare it with the supplementary biomarker reference limit. In addition, the control unit may also be configured to compare the supplementary biomarker level with the supplementary biomarker reference limit. The control unit may be configured to indicate health condition of the animal based on the made comparison of the supplementary biomarker level and the supplementary biomarker reference limit, and the comparison of the Haptoglobin level with the Haptoglobin reference limit.

The health condition of the animal may thereby be determined with enhanced precision.

In yet an implementation of the milking arrangement according to the first aspect, or according to any implementation thereof, the control unit may, when triggered by detection of a difference between the obtained Haptoglobin level and the previously stored Haptoglobin level exceeding a threshold limit, be further configured to obtain the supplementary biomarker level. Also, the control unit may be configured to obtain the supplementary biomarker level. The control unit may in addition be configured to compare it with the supplementary biomarker reference limit. Furthermore, the control unit may be configured to indicate health condition of the animal based on the made comparison of the supplementary biomarker level and the supplementary biomarker reference limit, and the comparison of the Haptoglobin level with the Haptoglobin reference limit.

A sudden change in Haptoglobin level of the animal may thereby trigger measurements of the supplementary biomarker level. The health condition of the animal may then be determined with enhanced reliability, based also on a comparison between the supplementary biomarker level and the supplementary biomarker reference limit.

In yet an implementation of the milking arrangement according to the first aspect, or according to any implementation thereof, the control unit may be configured to, when triggered by the predetermined time-period having passed from the reference point in time, determine to take the further milk sample of the animal.

Thereby, a milk sample and thereby also Haptoglobin level and/or supplementary biomarker level of the animal may be taken from the animal at a predetermined critical time-period.

In yet an implementation of the milking arrangement according to the first aspect, or according to any implementation thereof, the control unit may be further configured to, when triggered by the obtained Haptoglobin level exceeding the Haptoglobin reference limit, determine to take a third milk sample of the animal. Also, the control unit may be configured to select an additional biomarker, distinct from Haptoglobin and the supplementary biomarker. The control unit may be configured to obtain the additional biomarker level from the third milk sample of the animal, of the selected additional biomarker. Furthermore, the control unit may be configured to compare the obtained additional biomarker level with an additional biomarker reference limit. Also, the indicated health condition of the animal may be based on the made comparison between the additional biomarker level and the additional biomarker reference limit.

By taking yet a milk sample and determine yet an additional biomarker level, the health condition of the animal may be determined with enhanced reliability.

In yet an implementation of the milking arrangement according to the first aspect, or according to any implementation thereof, the control unit may be further configured to select the supplementary biomarker from any of: Lactate Dehydrogenase (LDH), Beta-Hydroxybutyrate (BHB), conductivity, or somatic cell count.

In yet an implementation of the milking arrangement according to the first aspect, or according to any implementation thereof, the control unit may be further configured to select the additional biomarker from any of: BHB, conductivity, or somatic cell count, while being different from the supplementary biomarker.

In yet an implementation of the milking arrangement according to the first aspect, or according to any implementation thereof, the control unit may be configured to indicate the health condition of the animal to concern metritis, when the predetermined time period is between about 5-10 days, and the obtained Haptoglobin level exceeds the Haptoglobin reference limit.

In yet an implementation of the milking arrangement according to the first aspect, or according to any implementation thereof, the health condition of metritis may be indicated by the control unit when the obtained supplementary biomarker level is lower than the supplementary biomarker reference limit while the obtained Haptoglobin level exceeds the Haptoglobin reference limit.

In yet an implementation of the milking arrangement according to the first aspect, or according to any implementation thereof, the control unit may be configured to indicate the health condition of the animal to concern endometritis, when the predetermined time period is between about 11-30 days, and the obtained Haptoglobin level exceeds the Haptoglobin reference limit.

In yet an implementation of the milking arrangement according to the first aspect, or according to any implementation thereof, the health condition of endometritis may be indicated by the control unit when the obtained supplementary biomarker level is lower than the supplementary biomarker reference limit while the obtained Haptoglobin level exceeds the Haptoglobin reference limit.

In yet an implementation of the milking arrangement according to the first aspect, or according to any implementation thereof, the control unit may be configured to indicate the health condition of the animal to concern lameness, when the predetermined time period is between about 40-100 days and the obtained Haptoglobin level exceeds the Haptoglobin reference limit.

In yet an implementation of the milking arrangement according to the first aspect, or according to any implementation thereof, the health condition of lameness may be indicated by the control unit when the obtained supplementary biomarker level is lower than the supplementary biomarker reference limit while the obtained Haptoglobin level exceeds the Haptoglobin reference limit.

In yet an implementation of the milking arrangement according to the first aspect, or according to any implementation thereof, the control unit may be configured to indicate the health condition of the animal to concern acute mastitis, when the predetermined time period is between about 0-30 days and the obtained Haptoglobin level exceeds a second Haptoglobin reference limit, which is higher than the Haptoglobin reference limit.

In yet an implementation of the milking arrangement according to the first aspect, or according to any implementation thereof, the health condition of acute mastitis may be indicated by the control unit when the obtained supplementary biomarker level exceeds the supplementary biomarker reference limit while the obtained Haptoglobin level exceeds the second Haptoglobin reference limit.

In yet an implementation of the milking arrangement according to the first aspect, or according to any implementation thereof, the control unit may be configured to indicate the health condition of the animal to concern chronic mastitis, when the obtained Haptoglobin level is lower than the Haptoglobin reference limit, while being higher than a third Haptoglobin reference limit, which is lower than the Haptoglobin reference limit.

In yet an implementation of the milking arrangement according to the first aspect, or according to any implementation thereof, the health condition of chronic mastitis may be indicated by the control unit when the obtained supplementary biomarker level is higher than the supplementary biomarker reference limit while the obtained Haptoglobin level is lower than the Haptoglobin reference limit while being higher than a third Haptoglobin reference limit for at least 30 consecutive days.

By determining the Haptoglobin level of an extracted milk sample of the animal, and possibly also other biomarker measurements at predetermined points in time, and make comparisons with respective reference limits, a health indication is obtained concerning the animal, which may trigger additional milk sample extraction and biomarker measurements and/or other health related measures such as visual inspection by the farmer, temperature measurement of the animal etc.

An unhealthy animal may thereby be identified at an early stage and further health examination and appropriate counter measures may be initiated in order to minimise or at least reduce the suffering of the animal and the negative consequences for the milk yield. Also, or alternatively, the animal may be categorised as healthy when the current Haptoglobin level is lower than the Haptoglobin reference limit. Thereby, the farmer may focus visual inspection and/or other measures at the farm to other animals, having a current Haptoglobin level which is higher than the Haptoglobin reference limit, or presenting deviating/unexpected values.

Other advantages and additional novel features will become apparent from the subsequent detailed description.

FIGURES

Embodiments of the invention will now be described in further detail with reference to the accompanying figures, in which.

DETAILED DESCRIPTION

Embodiments of the invention described herein are defined as a milking arrangement, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
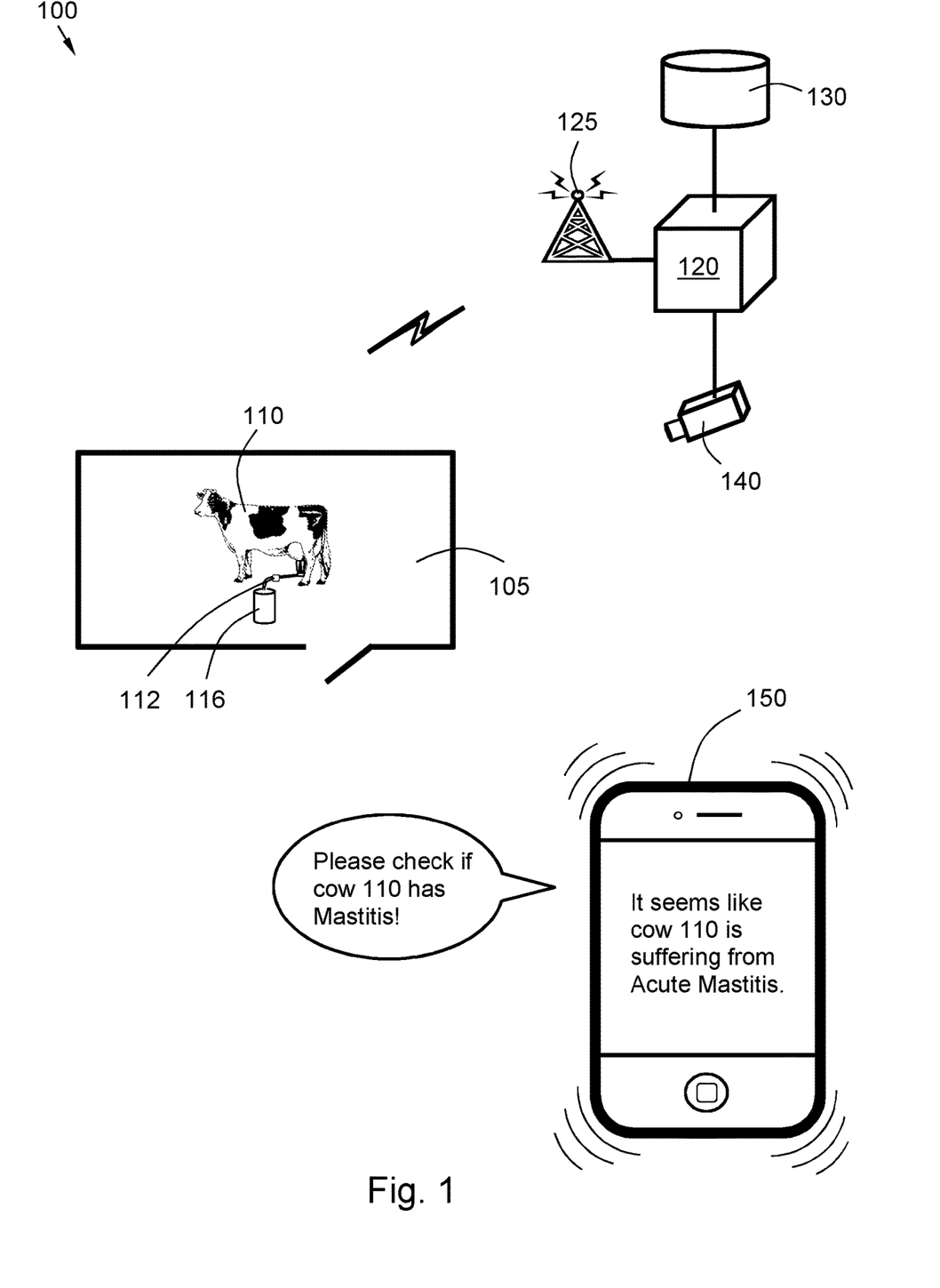
FIG. 1 illustrates an example of a system for assisting a farmer in determining health condition of animals at the farm, according to an embodiment of the invention.

FIG. 1 illustrates a scenario with a milking arrangement 100 in a milking parlour 105 at a farm. The milking arrangement 100 comprises a milking machine 116 for milking an animal 110.

The milking parlour 105 may comprise e.g. a stanchion, a milking robot, a rotary milking platform, etc.

"Animal" may be any arbitrary type of domesticated milk producing animal; such as for example cow, goat, sheep, camel, dairy buffalo, yak, etc.

The milking arrangement 100 comprises a control unit 120. The control unit 120 is configured to identify the animal 110. The animal 110 may for example be identified by a tag attached to a body part of the animal 110, such as e.g. the head of the animal 110, an ear of the animal 110, etc. The tag may comprise information uniquely identifying the animal 110, i.e. an identity reference.

The control unit 120 may determine identity and/or optionally also a body status parameter or activity of the animal 110, based on signals emitted by the tag, possibly received by a transceiver 125, connected to the control unit 120.

The animal 110 may alternatively, in some embodiments, be identified by an image, captured by a camera/video camera 140, e.g. during milking or at any other convenient moment. The captured image may be compared with previously stored images of animals at the farm, which may have been stored in a database 130 associated with a respective identity reference. When the comparison results in a match, based on skin pattern matching, the associated identity reference may be extracted.

Having determined the identity of the animal 110, the control unit 120 is configured to determine a reference point in time of a lactation cycle of the identified animal 110. The reference point in time of the lactation cycle may for example be the day of calving of the animal 110, days in milk, etc.

A milk sample may then be extracted from the animal 110, during the milking process of the animal 110 in the milking machine 116, when a predetermined time-period has passed from the reference point in time of the lactation cycle.

Different moments in time; or time intervals, as countered from either the reference point in time or the latest extracted milk sample may be predefined or configurable. It has been observed that different animal diseases are more likely to occur than others during different time periods of the lactation cycle. Mastitis, for example, may occur during the whole lactation but is most frequent during the first approximately 30 days after calving. Metritis is most frequent within the first about 5-10 days after calving, endometriosis is most frequent within about 11-30 days after calving while lameness often starts to be visible between about 40-80 days from calving.

Based on these observations, milk samples may be extracted concerning the respective disease, and an analysis of the extracted milk sample may be made, with a focus on the respective disease associated with the time-period.

The control unit 120 is also configured to analyse the milk sample by obtaining a Haptoglobin level from the milk sample of the identified animal 110.

Haptoglobin is an acute phase protein. In the acute phase of an inflammation, Haptoglobin is secreted from the liver to bind iron in the blood and thereby reduce the life conditions for the pathogens. The Haptoglobin level of the animal 110 then rises to high concentrations. For this reason, the Haptoglobin level may be regarded as an indicator of the health condition of the animal 110.

Increased Haptoglobin level is an early inflammation marker. The immediate detection of an inflammatory response, by detecting the increased Haptoglobin level, enables an early detection of an inflammatory process.

The Haptoglobin level may be determined by a sensor 112 in some embodiments, configured to determine Haptoglobin level from the milk sample of the animal 110, and provide the determined Haptoglobin level to the control unit 120.

The related diseases, i.e. mastitis, metritis, endometritis, lameness, may be both invisible, or subclinical; and/or visible, or clinical. In the subclinical version, it affects the animal 110 in a hidden way, where her behaviour is a bit suppressed.

Since Haptoglobin is released independent of disease, a conceptual idea of the solution is to combine the Haptoglobin measures in a biometric model with other measures like Lactate DeHydrogenase (LDH), as a descriptor for udder health and days from calving to point at the most likely disease.

LDH is an enzyme found in nearly all living cells of animals. LDH catalyses the conversion of lactate to pyruvic acid and back, as it converts NAD+ to NADH and back. A dehydrogenase is an enzyme that transfers a hydride from one molecule to another.

The determined Haptoglobin level of the milk sample of the identified animal 110 is then compared with a Haptoglobin reference limit. The Haptoglobin reference limit may be predetermined and stored in the database 130. Based on the made comparison, a health condition of the animal 110 may be indicated.

By determining Haptoglobin level, applied in a biometric model, the animal 110 may be categorised as a healthy animal, or an attention animal, that may require additional health analysis. Thus, a Haptoglobin level that deviates from a normal Haptoglobin level interval may trigger a more meticulous health examination of the animal 110 in question by applying further tests or alerting the farmer or a veterinary for a visual inspection of the animal 110.

The aforementioned optional tag of the animal 110 may in some embodiments also comprise a device for determining activity of the animal 110, such as e.g. an accelerometer, a pedometer, a pulse meter, a blood pressure monitoring device, a thermometer for determining body temperature of the animal 110, etc. This information may in some particular embodiments be monitored by the control unit 120, and may be used as a complement to other information of the animal 110, for determining/confirming health status of the animal 110.

An animal suffering from illness typically moves less than a healthy animal; lay down more time than a healthy animal; has a higher body temperature than a healthy animal, etc.

The optional accelerometer of the tag may perform high frequency recordings of bi-axial and/or tri-axial acceleration, which allows for discrimination of behavioural patterns like determining whether the animal 110 is standing or laying down, for example. The behavioural pattern for supportive diagnosis of the animal 110, may complement other information based on the measured Haptoglobin level for estimating the health condition of the animal 110 in some embodiments.

The tag may comprise a transponder, comprising an identity reference of the animal 110. The tag may emit wireless signals which may be received by the control unit 120 via a number of transceivers, such as typically at least three transceivers.

The wireless signals may be made via transmitted between the tag and the wireless signal transceivers via any convenient wireless communication technology such as Ultra-Wide Band (UWB), Bluetooth (BT), Wireless Universal Serial Bus (Wireless USB), Radio-Frequency Identification (RFID), W-Fi, etc.

In some embodiments, an alert may be sent to a communication device 150 of the farmer, or other relevant/responsible person at the farm. An identification reference and possibly a suspected disease may be indicated in a message to the farmer, who thereby is enabled to take various measures, such as e.g. inspect the identified animal 110.

Hereby, thanks to the disclosed solution, the farmer does not have to pay attention to the health condition of the animals by continuously performing labour demanding monitoring programs. Instead, the farmer can focus on the identified problem animals, yet being assured that no animal at the farm is allowed to remain in an unhealthy condition.

Figure 2:
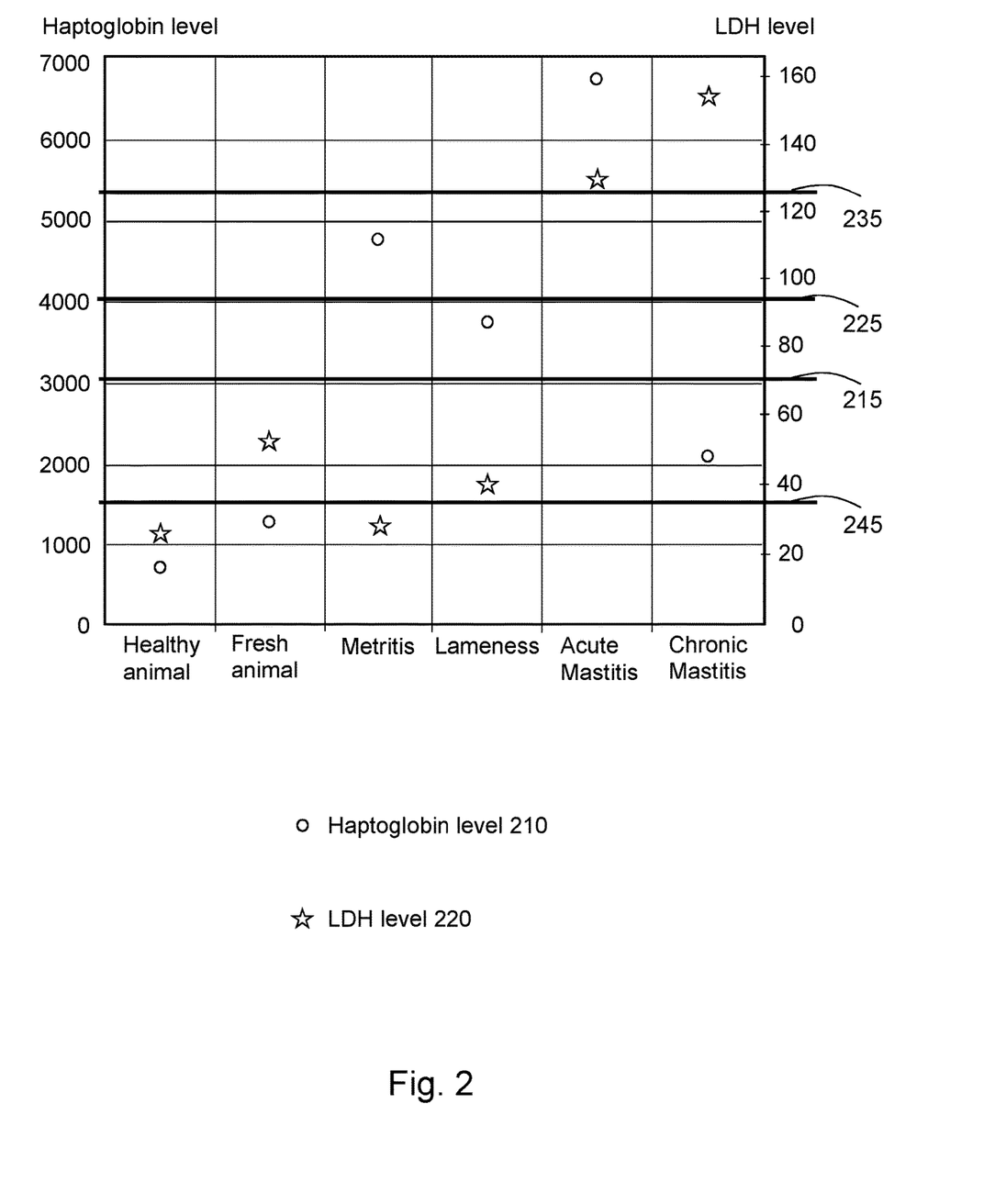
FIG. 2 illustrates combinations between Haptoglobin, LDH and days from the reference point in time of the lactation cycle, according to an example.

FIG. 2 illustrates combinations between Haptoglobin, LDH and days from the reference point in time of the lactation cycle, according to an example, for different health conditions of the animal 110. In this example, LDH is used as a supplementary biomarker, which may be measured in some embodiments in order to verify the result of the Haptoglobin level measurement. LDH is however merely one possible supplementary biomarker out of many, such as e.g. Beta-Hydroxybutyrate (BHB), conductivity, and/or somatic cell count.

A typical Haptoglobin level 210 and a typical LDH level 220, at different health conditions of an animal 110 are indicated in the figure. A health condition of an animal 110 may then be indicated by comparing the determined Haptoglobin level 210 and/or LDH level 220 with a Haptoglobin reference limit 215 and/or a supplementary biomarker reference limit 225, respectively.

Also, a second Haptoglobin reference limit 235, which is higher than the Haptoglobin reference limit 215; and a third Haptoglobin reference limit 245, which is lower than both the Haptoglobin reference limit 215 and the second Haptoglobin reference limit 235. These second and third Haptoglobin reference limits 235, 245 may be used in some embodiments to distinguish between different health conditions of the animal 110.

The Haptoglobin level 210 and the supplementary biomarker level 220 may typically be somewhat different for different animal arts/types, different animal races, and different individuals, e.g. due to different genetic predisposition. For this reason, the Haptoglobin reference limits 215, 235, 245 and/or the supplementary biomarker reference limit 225 may be set to different respective values, e.g. for different animal races, different farms, different animal groups at a farm, animals of different ages/lactation numbers at the farm, or different individual animals, etc.

When interpreting the example of values illustrated in FIG. 2, a typical Haptoglobin level 210 of a healthy animal may be about 800; a typical Haptoglobin level 210 of a healthy fresh animal may be about 1200; a typical Haptoglobin level 210 of an animal 110 with metritis may be about 4800; a typical Haptoglobin level 210 of an animal 110 with lameness may be about 3800; a typical Haptoglobin level 210 of an animal 110 with acute mastitis may be about 6700; and/or a typical Haptoglobin level 210 of an animal 110 with chronic mastitis may be about 2200. These different values of the Haptoglobin level 210 at different health conditions are merely to be regarded as example of values. The relative position of the Haptoglobin level 210 at different health conditions in relation to the Haptoglobin reference limit 215 is more interesting for determining the health condition of the animal 110 than the haptoglobin level 210 per se.

When analysing the animal 110, the Haptoglobin level 210 is determined. The determined Haptoglobin level 210 is then compared with the Haptoglobin reference limit 215 and the result is analysed; i.e. the comparison may result in a conclusion that the Haptoglobin level 210 is higher than, or lower than the Haptoglobin reference limit 215. In case the Haptoglobin level 210 is lower than the Haptoglobin reference limit 215, the animal 110 may be determined to be either healthy or suffering from chronic mastitis. Otherwise, the animal 110 may be suffering from metritis, lameness, endometritis and/or acute mastitis, which health condition may be confirmed based on a passed time from the reference time point and/or the supplementary biomarker level 220.

To determine the result more precisely, further analyse may be performed in some embodiments, e.g. by determining the time-period that has passed since the reference point in time of a lactation cycle of the identified animal 110. Chronic mastitis may be suspected when the predetermined time-period that has passed from the reference point in time is exceeding 30 days. Another possible further analysis may be to determine the LDH level 220 of the animal 110 and compare it with the supplementary biomarker reference limit 225. In case the determined LDH level 220 is lower than the supplementary biomarker reference limit 225, the animal 110 may be determined to be healthy. Otherwise, when the LDH level 220 exceeds the supplementary biomarker reference limit 225, the animal 110 may be suspected to suffer from chronic mastitis. An alert may be sent to the farmer, and/or a registration may be made in the database 130 concerning the health condition of the animal 110.

In case both the Haptoglobin level 210 and the supplementary biomarker level 220 are measured, both these biomarkers may be used for determining the health condition of the animal 110 with better precision. In case the Haptoglobin level 210 is lower than the Haptoglobin reference limit 215 and the supplementary biomarker level 220 is lower than the supplementary biomarker reference limit 225, and/or less than 30 days have passed from the reference point in time, the animal 110 may be considered to be healthy.

A fresh animal 110 is an animal that has recently calved, i.e. within the last 30 days. In case the Haptoglobin level 210 is lower than the Haptoglobin reference limit 215 and the supplementary biomarker level 220 is lower than the supplementary biomarker reference limit 225, the animal 110 may be determined to be healthy.

In some embodiments, the analysis based on the Haptoglobin level 210, the supplementary biomarker level 220, and the time-period that has passed from the reference point in time may be completed with an additional biomarker, distinct from Haptoglobin and the supplementary biomarker (e.g. LDH). The additional biomarker may e.g. comprise BHB, conductivity, or somatic cell count. In case the determined level of the additional biomarker/BHB is within a range for a healthy animal, then the animal 110 may be determined to be healthy. If BHB is high the aetiology for the high level of the additional biomarker/BHB is not due to sickness but more likely due to the nutrient composition and feed intake.

Figure 3:
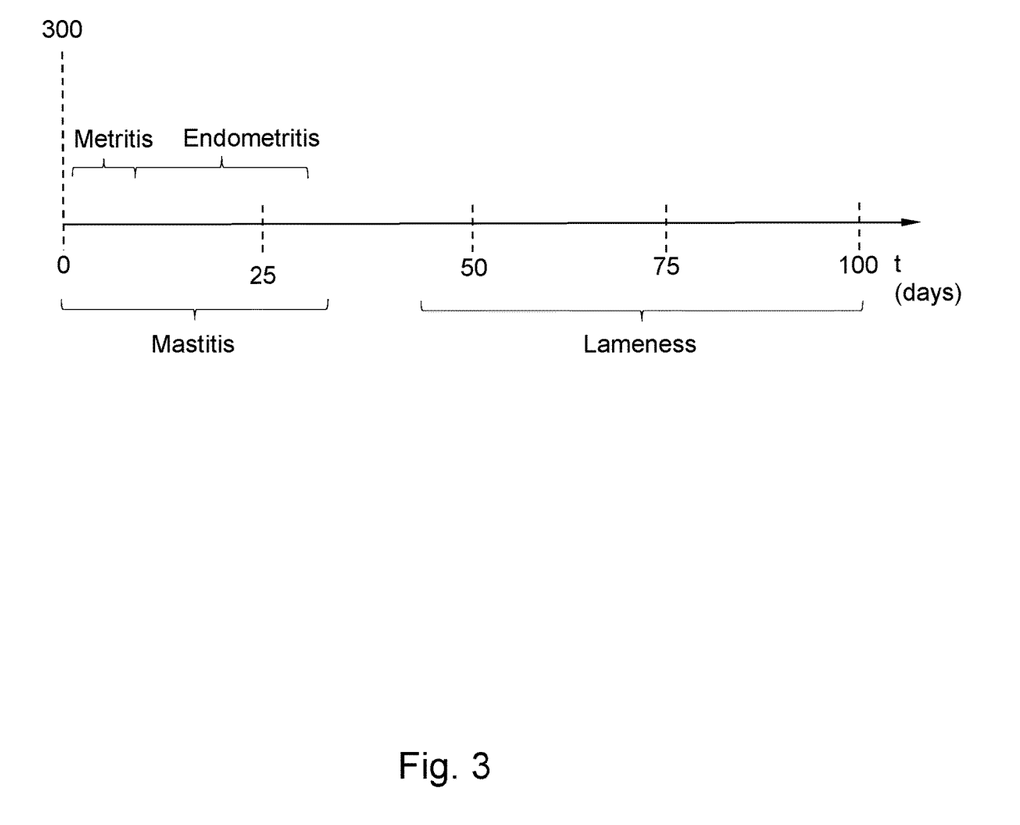
FIG. 3 illustrates dominating health problems at different time periods after the reference point in time of the lactation cycle, according to an example.

FIG. 3 schematically illustrates a reference point in time 300 of a lactation cycle of the identified animal 110, for example the moment of calving.

The figure illustrates how different diseases may be associated with different passed time periods from the determined reference point in time 300.

In some embodiments, wherein less than about 10 days has passed since the reference point in time 300, the Haptoglobin level 210 is higher than the Haptoglobin reference limit 215, and the supplementary biomarker level 220 is lower than the supplementary biomarker reference limit 225, the most likely disease is metritis.

The idea according to some embodiments may be to use a time sensing model with measures at certain predetermined points in time, to profile the level of Haptoglobin 210 and identify a peak point indicating the sickness.

When the passed time-period from the determined reference point in time 300 is between approximately 40-80 days, the level of Haptoglobin 210 exceeds the Haptoglobin reference limit 215 while the supplementary biomarker level 220 is lower than the supplementary biomarker reference limit 225, the most likely disease is lameness.

If the Haptoglobin level 210 is higher than the Haptoglobin reference limit 215 and the supplementary biomarker level 220 exceeds the supplementary biomarker reference limit 225, the animal 110 may have acute mastitis. The time sensing model may potentially classify a spike in the supplementary biomarker level 220, such as e.g. LDH or conductivity as either an acute mastitis or a chronic case.

For example, if an increase in the supplementary biomarker level 220 is discovered, an order for measuring Haptoglobin level 210 may be executed and the result may help in determining the type of treatment.

When the acute phase of an inflammation is over the Haptoglobin level 210 becomes lower, such as lower than the Haptoglobin reference limit 215 but still it may indicate that the animal 110 has an inflammation.

Using Haptoglobin level measurements in the time sensing model may distinguish whether the animal 110 is healthy or non-healthy. By combining the Haptoglobin level measurements also with other biomarker measurements, further indications concerning the disease may be indicated.

Figure 4:
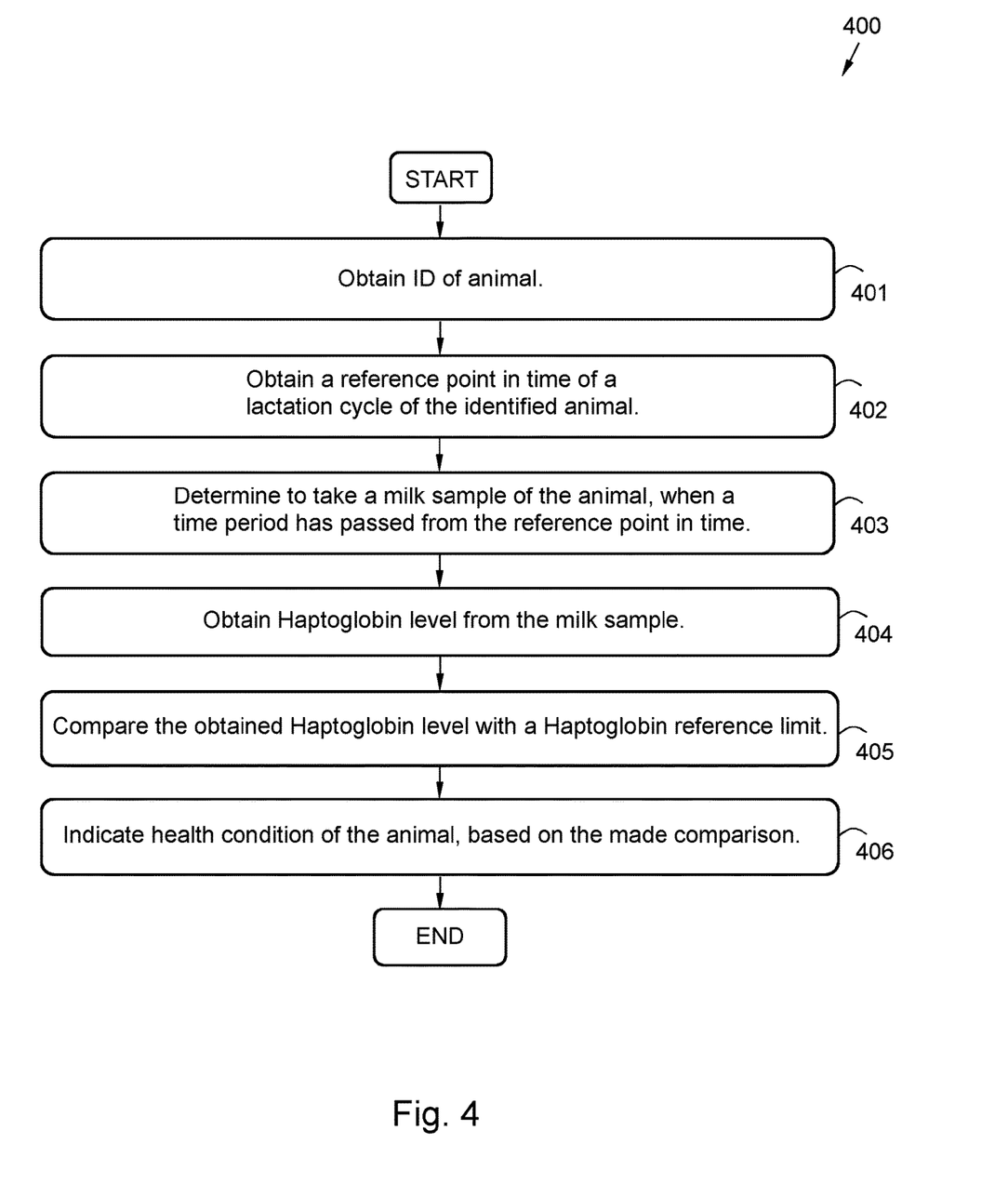
FIG. 4 is a flow chart illustrating an embodiment of a method.

FIG. 4 illustrates an example of a method 400 according to an embodiment. The flow chart in FIG. 4 shows the method 400 executed in a control unit 120 for assisting a farmer in determining a health condition of an animal 110. The control unit 120 is comprised in a milking arrangement 100, which also comprises a milking machine 116.

In order to correctly assist the farmer in determining the animal health condition, the method 400 may comprise a number of steps 401-406. However, some of these steps 401-406 may be performed solely in some alternative embodiments. Further, the described steps 401-406 may be performed in a somewhat different chronological order than the numbering suggests. The method 400 may comprise the subsequent steps:

Step 401 comprises obtaining an identity reference of the animal 110.

The identity reference may comprise any globally or locally unique indicator making it possible to unambiguously identify the animal 110, e.g. via an RFID tag of the animal 110, by image recognition of the animal 110, or an image recognition of a number plate of the animal, etc.

Step 402 comprises obtaining a reference point in time 300 of a lactation cycle of the identified animal 110.

The reference point in time 300 may be the moment of calving/parturition in some embodiments. However, any other arbitrary moment in time within the lactation cycle may be used as the reference point in time 300. Information concerning the lactation cycle of the animal 110 may be obtained from a memory/database 130, associated with the identity reference of the animal 110.

Step 403 comprises determining to take at least one milk sample of the animal 110, when a predetermined time-period has passed from the reference point in time 300.

The predetermined time-period may be a time interval in some embodiments, such as e.g. between 16-32 hours. The predetermined time-period may be synchronised with an estimated milking periodicity of the animal 110 in some embodiments, i.e. that the milk sample may be extracted from the animal 110 during, or in association with regular milking of the animal 110.

In some embodiments, the milk sample of the animal 110 may be taken iteratively in some embodiments, at regular or irregular time intervals such as e.g. twice a day, every day, and/or within a time interval from the latest extracted milk sample such as within 15-30 hours from the latest milk sample.

Step 404 comprises obtaining a Haptoglobin level 210 from the extracted milk sample.

The Haptoglobin level 210 may be determined by the sensor 112 by chemical analysis. In some embodiments, the sensor 112 may be based on dry stick technology. Alternatively, a commercial ELISA (enzyme-linked immunosorbent assay) test equipment for determination of Haptoglobin in the milk sample.

The obtained Haptoglobin level 210 of the respective milk sample may be stored in a memory 130 of the milking arrangement 100 in some embodiments, associated with a time reference, and also associated with the identity reference of the animal 110.

Step 405 comprises comparing the obtained 404 Haptoglobin level 210 with a Haptoglobin reference limit 215.

The Haptoglobin reference limit 215 may be calculated based on a value of at least one stored Haptoglobin level 210.

In some embodiments, a difference between the obtained Haptoglobin level 210 and a previously stored Haptoglobin level 210 may be determined.

Step 406 comprises indicating health condition of the animal 110, based on the made comparison between the obtained 404 Haptoglobin level 210 and the Haptoglobin reference limit 215.

In some embodiments, the animal 110 may be considered healthy when the obtained 404 Haptoglobin level 210 is lower than the Haptoglobin reference limit 215 and the animal 110 does not have a record of previous acute mastitis.

The indication of the health condition may be based on the determined difference between the obtained 404 Haptoglobin level 210 and the Haptoglobin reference limit 215.

Figure 5:
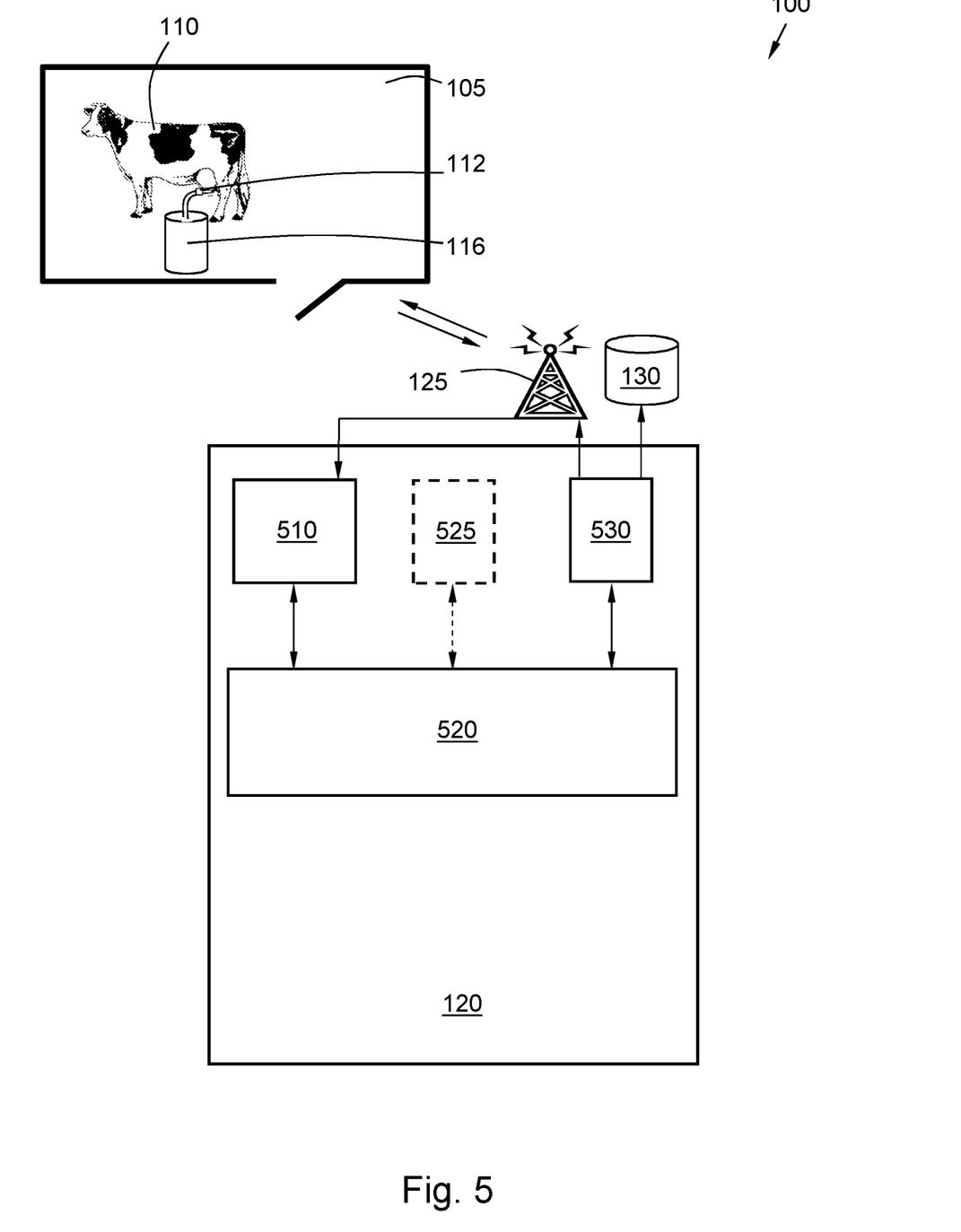
FIG. 5 is an illustration depicting a milking arrangement according to an embodiment.

FIG. 5 illustrates an embodiment of a milking arrangement 100 comprising a milking machine 116 for milking an animal 110, wherein the milking arrangement 100 comprises a control unit 120.

The control unit 120 is configured to perform at least some of the previously described steps 401-406 according to the method 400 described above and illustrated in FIG. 4. The control unit 120 is thereby configured to obtain identity of the animal 110 in connection with milking of the animal 110. Further, the control unit 120 is configured to obtain a reference point in time 300 of a lactation cycle of the identified animal 110. Also, the control unit 120 is configured to determine to take at least one milk sample of the animal 110, when a predetermined time-period has passed from the reference point in time 300. The control unit 120 is furthermore configured to obtain a Haptoglobin level 210 from the milk sample. The control unit 120 is additionally configured to compare the obtained Haptoglobin level 210 with a Haptoglobin reference limit 215. Further, the control unit 120 is configured to indicate health condition of the animal 110, based on the made comparison.

The control unit 120 may in some embodiments also be configured to iteratively take milk samples of the animal 110. Further, the control unit 120 may be configured to store the obtained Haptoglobin level 210 of the respective milk sample in a memory 130 of the milking arrangement 100, associated with a time reference. Also, the control unit 120 may be additionally configured to determine a difference between the obtained Haptoglobin level 210 and a previously stored Haptoglobin level 210. Further, the control unit 120 may also be configured to indicate the health condition based on the determined difference.

In some embodiments, the control unit 120 may be configured to calculate the Haptoglobin reference limit 215, based on a value of at least one stored Haptoglobin level 210. The Haptoglobin reference limit 215 may for example be an average value based on a number of stored Haptoglobin level values; or a stored Haptoglobin level value which was sampled and stored at a moment when other health monitoring such as visual inspection, body temperature, milk yield, etc., indicated that the animal 110 was healthy.

Furthermore, the control unit 120 may be configured to determine to take a further milk sample of the animal 110. The control unit 120 may also, in some embodiments, be configured to select a supplementary biomarker, distinct from Haptoglobin. Also, the control unit 120 may be configured to obtain a supplementary biomarker level 220 from the further milk sample of the animal 110, of the selected supplementary biomarker. The control unit 120 may be further configured to compare the obtained supplementary biomarker level 220 with a supplementary biomarker reference limit 225. The control unit 120 may also be configured to indicate the health condition of the animal 110 based on the made comparison of the supplementary biomarker level 220 and the supplementary biomarker reference limit 225, and the comparison of the Haptoglobin level 210 with the Haptoglobin reference limit 215.

The supplementary biomarker may for example comprise Lactate Dehydrogenase (LDH). Alternatively, the supplementary biomarker may comprise Beta-Hydroxybutyrate (BHB), conductivity, somatic cell count or similar.

In yet some embodiments, the control unit 120 may be configured to iteratively take further milk samples of the animal 110. The control unit 120 may also be configured to store the obtained supplementary biomarker level 220 of the respective further milk samples in the memory 130 of the milking arrangement 100, associated with a time reference. In addition, the control unit 120 may be configured to determine a difference between the obtained supplementary biomarker level 220 and a previously stored supplementary biomarker level 220. The control unit 120 may also be configured to indicate the health condition of the animal 110 based on the determined difference between the obtained supplementary biomarker level 220 and a previously stored supplementary biomarker level 220.

The control unit 120 may be configured to calculate the supplementary biomarker reference limit 225, based on at least one stored supplementary biomarker level 220.

In some embodiments, the control unit 120 may be configured to, when triggered by the obtained Haptoglobin level 210 exceeding the Haptoglobin reference limit 215, obtain the supplementary biomarker level 220. Further, the control unit 120 may be additionally configured to compare it with the supplementary biomarker reference limit 225. The control unit 120 may also be configured to indicate health condition of the animal 110 based on the made comparison of the supplementary biomarker level 220 and the supplementary biomarker reference limit 225, and the comparison of the Haptoglobin level 210 with the Haptoglobin reference limit 215.

The control unit 120 may in addition be configured to obtain the supplementary biomarker level 220 when triggered by detection of a difference between the obtained Haptoglobin level 210 and the previously stored Haptoglobin level 210 exceeding a threshold limit. Further, the control unit 120 may be configured to compare it with the supplementary biomarker reference limit 225. Also, the control unit 120 may be configured to indicate health condition of the animal 110 based on the made comparison of the supplementary biomarker level 220 and the supplementary biomarker reference limit 225, and the comparison of the Haptoglobin level 210 with the Haptoglobin reference limit 215.

In yet some embodiments, the control unit 120 may in addition be configured to determine to take the further milk sample of the animal 110 when triggered by the predetermined time-period having passed from the reference point in time 300.

The control unit 120 may be configured to, when triggered by the obtained Haptoglobin level 210 exceeding the Haptoglobin reference limit 215, determine to take a third milk sample of the animal 110. Further, the control unit 120 may be configured to select an additional biomarker, distinct from Haptoglobin and the supplementary biomarker. Also, the control unit 120 may be configured to obtain the additional biomarker level from the third milk sample of the animal 110, of the selected additional biomarker. In addition, the control unit 120 may be configured to compare the obtained additional biomarker level with an additional biomarker reference limit; and indicate the health condition of the animal 110 based on the made comparison between the additional biomarker and the additional biomarker level.

The control unit 120 may determine the additional biomarker. The additional biomarker may comprise e.g. BHB, conductivity, or somatic cell count, while being different from the supplementary biomarker. Thereby, when the supplementary biomarker is determined to be BHB, the additional biomarker is not determined to be BHB, but rather conductivity or somatic cell count, etc.

The control unit 120 may be configured to indicate the health condition of the animal 110 to concern metritis, when the predetermined time-period is between about 5-10 days, and the obtained Haptoglobin level 210 exceeds the Haptoglobin reference limit 215.

In yet some embodiments wherein the supplementary biomarker level 220 has been obtained, the control unit 120 may be configured to indicate the health condition of metritis when the obtained supplementary biomarker level 220 is lower than the supplementary biomarker reference limit 225 while the obtained Haptoglobin level 210 exceeds the Haptoglobin reference limit 215.

The control unit 120 may be configured to indicate the health condition of the animal 110 to concern: endometritis, when the predetermined time-period is between about 11-30 days, and the obtained Haptoglobin level 210 exceeds the Haptoglobin reference limit 215.

In some embodiments, wherein the supplementary biomarker level 220 has been obtained, the control unit 120 may be configured to indicate the health condition of endometritis when the obtained supplementary biomarker level 220 is lower than the supplementary biomarker reference limit 225 while the obtained Haptoglobin level 210 exceeds the Haptoglobin reference limit 215.

The control unit 120 may be configured to indicate the health condition of the animal 110 to concern: lameness, when the predetermined time-period is between about 40-100 days and the obtained Haptoglobin level 210 exceeds the Haptoglobin reference limit 215.

In yet some embodiments, wherein the supplementary biomarker level 220 has been obtained, the control unit 120 may be configured to indicate the health condition of lameness when the obtained supplementary biomarker level 220 is lower than the supplementary biomarker reference limit 225 while the obtained Haptoglobin level 210 exceeds the Haptoglobin reference limit 215.

The control unit 120 may be configured to indicate the health condition of the animal 110 to concern: acute mastitis, when the predetermined time-period is between about 0-30 days and the obtained Haptoglobin level 210 exceeds a second Haptoglobin reference limit 235, which is higher than the Haptoglobin reference limit 215.

In some embodiments, wherein the supplementary biomarker level 220 has been obtained, the control unit 120 may also be configured to indicate the health condition of acute mastitis when the obtained supplementary biomarker level 220 exceeds the supplementary biomarker reference limit 225 while the obtained Haptoglobin level 210 exceeds the second Haptoglobin reference limit 235.

The control unit 120 may be configured to indicate the health condition of the animal 110 to concern: chronic mastitis, when the obtained Haptoglobin level 210 is lower than the Haptoglobin reference limit 215, while being higher than a third Haptoglobin reference limit 245, which is lower than the Haptoglobin reference limit 215.

In some embodiments, wherein the supplementary biomarker level 220 has been obtained, the control unit 120 may be configured to indicate the health condition of chronic mastitis when the obtained supplementary biomarker level 220 is higher than the supplementary biomarker reference limit 225 while the obtained Haptoglobin level 210 is lower than the Haptoglobin reference limit 215 while being higher than a third Haptoglobin reference limit 245 for at least 30 consecutive days.

The milking arrangement 100 may in some embodiments also comprise a database 130, configured to store animal status related parameters.

The control unit 120 may comprise a receiver 510 configured to receive information from the transceiver 125, from the sensor 112.

The control unit 120 also comprises a processing circuit 520 configured for performing various calculations for conducting the method 400 according to at least some of the previously described steps 401-406.

Such processing circuit 520 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

Furthermore, the control unit 120 may comprise a memory 525 in some embodiments. The optional memory 525 may comprise a physical device utilised to store data or programs, i.e., sequences of instructions, on a temporary or permanent basis. According to some embodiments, the memory 525 may comprise integrated circuits comprising silicon-based transistors. The memory 525 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

Further, the control unit 120 may comprise a signal transmitter 530. The signal transmitter 530 may be configured for transmitting signals via a wired or wireless communication interface to the transceiver 125 and/or the database 130.

However, in some alternative embodiments, the milking arrangement 100 may comprise additional units for performing the method 400 according to steps 401-406.

The above described steps 401-406 to be performed in the control unit 120 may be implemented through the one or more processing circuits 520 within the control unit 120, together with a computer program for performing at least some of the functions of the steps 401-406. Thus, the computer program comprises instructions which, when the computer program is executed by the control unit 120 in the system 100, cause the control unit 120 to carry out the method 400 according to at least some of steps 401-406.

The computer program mentioned above may be provided for instance in the form of a computer-readable medium, i.e. a data carrier carrying computer program code for performing at least some of the steps 401-406 according to some embodiments when being loaded into the one or more processing circuits 520 of the control unit 120. The data carrier may be, e.g., a hard disk, a CD ROM disc, a memory stick, an optical storage device, a magnetic storage device or any other appropriate medium such as a disk or tape that may hold machine readable data in a non-transitory manner. The computer program may furthermore be provided as computer program code on a server and downloaded to the control unit 120 remotely, e.g. over an Internet or an intranet connection.

The terminology used in the description of the embodiments as illustrated in the accompanying drawings is not intended to be limiting of the described method 400; the control unit 120; the computer program; the milking arrangement 100 and/or the computer-readable medium. Various changes, substitutions and/or alterations may be made, without departing from invention embodiments as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures or features are recited in mutually different dependent claims, illustrated in different figures or discussed in conjunction with different embodiments does not indicate that a combination of these measures or features cannot be used to advantage. A computer program may be stored/distributed on a suitable medium, such as an optical storage medium or a solid-state medium supplied together with or as part of other hardware but may also be distributed in other forms such as via Internet or other wired or wireless communication system.

The invention claimed is:

1. A milking arrangement, comprising:
a milking machine for milking an animal; and
a control unit, configured to:
   obtain an identity of the animal in connection with milking of the animal;
   obtain a reference point in time of a lactation cycle of the identified animal;
   when a predetermined time period has passed from the reference point in time of a lactation cycle of the identified animal, take a milk sample of the animal;
   obtain a Haptoglobin level from the milk sample;
   carry out a comparison of the obtained Haptoglobin level with a Haptoglobin reference limit; and
   indicate a health condition of the animal, based on the comparison of the obtained Haptoglobin level with the Haptoglobin reference limit,
wherein the control unit is further configured to:
   take a further milk sample of the animal;
   select a supplementary biomarker, distinct from Haptoglobin;
   obtain a supplementary biomarker level from the further milk sample of the animal, of the selected supplementary biomarker; and
   carry out a comparison of the obtained supplementary biomarker level with a supplementary biomarker reference limit,
wherein the health condition of the animal is indicated based on both the comparison of the supplementary biomarker level with the supplementary biomarker reference limit and the comparison of the obtained Haptoglobin level with the Haptoglobin reference limit, and
wherein the control unit is further configured to, when the obtained Haptoglobin level exceeds the Haptoglobin reference limit:
   obtain the supplementary biomarker level of the supplementary biomarker that is distinct from Haptoglobin; and
   carry out a comparison of the obtained supplementary biomarker level with the supplementary biomarker reference limit,
wherein the health condition of the animal is indicated based on both the comparison of the supplementary biomarker level with the supplementary biomarker reference limit and the comparison of the obtained Haptoglobin level with the Haptoglobin reference limit.

2. The milking arrangement according to claim 1, wherein the control unit is configured to take the milk sample from the animal repeatedly as iterative milk samples, and store a Haptoglobin level of each one of the iterative milk samples in a memory of the milking arrangement together with an associated time reference, said control unit further configured to determine a difference between the Haptoglobin level stored in the memory and a previously stored Haptoglobin level,
wherein the health condition is indicated based on the determined difference.

3. The milking arrangement according to claim 2, wherein the control unit is further configured to:
   calculate the Haptoglobin reference limit, based on a value of at least one stored Haptoglobin level.

4. The milking arrangement according to claim 1, wherein the control unit is configured to take the further milk sample from the animal repeatedly as iterative further milk samples, and store the supplementary biomarker level of each one of the iterative further milk samples in the memory of the milking arrangement together with an associated time reference, said control unit further configured to determine a difference between the obtained supplementary biomarker level stored in the memory and a previously stored supplementary biomarker level,
wherein the health condition is indicated based on the determined difference.

5. The milking arrangement according to claim 4, wherein the control unit is further configured to:
   calculate the supplementary biomarker reference limit, based on at least one stored supplementary biomarker level.

6. The milking arrangement according to claim 1, wherein the control unit is configured to take the further milk sample of the animal when the predetermined time period has passed a reference point in time.

7. The milking arrangement according to claim 1, wherein the control unit is further configured to, when the obtained Haptoglobin level exceeds the Haptoglobin reference limit:
   take a still further milk sample of the animal;
   select an additional biomarker, distinct from both Haptoglobin and the supplementary biomarker;
   obtain an additional biomarker level from the still further milk sample of the animal, of the selected additional biomarker;
   carry out a comparison of the obtained additional biomarker level with an additional biomarker reference limit,
   wherein the health condition of the animal is indicated based on the comparison between the additional biomarker level with the additional biomarker reference limit.

8. The milking arrangement according to claim 7, wherein the control unit is configured to select the additional biomarker from any of: BHB, conductivity, and somatic cell count, while being different from the supplementary biomarker.

9. The milking arrangement according to claim 1, wherein the control unit is configured to select the supplementary biomarker from any of: LDH, "Lactate Dehydrogenase", BHB, "Beta-Hydroxybutyrate", conductivity, and somatic cell count.

10. The milking arrangement according to claim 1, wherein the predetermined time period is between about 5-10 days, and the control unit is configured to, when the obtained Haptoglobin level exceeds the Haptoglobin reference limit, indicate the health condition of the animal to concern metritis.

11. The milking arrangement according to claim 1, wherein the predetermined time period is between about 5-10 days, and the control unit is configured to, when the obtained supplementary biomarker level is lower than the supplementary biomarker reference limit while the obtained Haptoglobin level exceeds the Haptoglobin reference limit, indicate the health condition of metritis.

12. The milking arrangement according to claim 1, wherein the predetermined time period is between about 11-30 days, and the control unit is configured to, when the obtained Haptoglobin level exceeds the Haptoglobin reference limit, indicate the health condition of the animal to concern endometritis.

13. The milking arrangement according to claim 1, wherein the predetermined time period is between about 11-30 days, and the control unit is configured to, when the obtained supplementary biomarker level is lower than the supplementary biomarker reference limit while the obtained Haptoglobin level exceeds the Haptoglobin reference limit, indicate the health condition of endometritis.

14. The milking arrangement according to claim 1, wherein the predetermined time period is between about 40-100 days, and the control unit is configured to, when the obtained Haptoglobin level exceeds the Haptoglobin reference limit, indicate the health condition of the animal to concern lameness.

15. The milking arrangement according to claim 1, wherein the predetermined time period is between about 0-30 days, and the control unit is configured to, when the obtained Haptoglobin level exceeds a second Haptoglobin reference limit, which is higher than the Haptoglobin reference limit, indicate the health condition of the animal to concern acute mastitis.

16. The milking arrangement according to claim 1, wherein the control unit is configured to, when the obtained Haptoglobin level is lower than the Haptoglobin reference limit while being higher than a third Haptoglobin reference limit, which is lower than the Haptoglobin reference limit, indicate the health condition of the animal to concern chronic mastitis.

17. The milking arrangement according to claim 1, wherein the control unit is configured to, when the obtained supplementary biomarker level is higher than the supplementary biomarker reference limit while the obtained Haptoglobin level is lower than the Haptoglobin reference limit while being higher than a third Haptoglobin reference limit for at least 30 consecutive days, indicate the health condition of chronic mastitis.

18. A milking arrangement, comprising:
  a milking machine for milking an animal; and
  a control unit, configured to:
    obtain an identity of the animal in connection with milking of the animal;
    obtain a reference point in time of a lactation cycle of the identified animal;
    when a predetermined time period has passed from the reference point in time of a lactation cycle of the identified animal, take a milk sample of the animal;
    obtain a Haptoglobin level from the milk sample;
    carry out a comparison of the obtained Haptoglobin level with a Haptoglobin reference limit; and
    indicate a health condition of the animal, based on the comparison of the obtained Haptoglobin level with the Haptoglobin reference limit,
  wherein the control unit is configured to take the milk sample from the animal repeatedly as iterative milk samples, and store a Haptoglobin level of each one of the iterative milk samples in a memory of the milking arrangement together with an associated time reference, said control unit further configured to determine a difference between the Haptoglobin level stored in the memory and a previously stored Haptoglobin level,
  wherein the health condition is indicated based on the determined difference, and
  wherein the control unit is further configured to, when a difference between the Haptoglobin level stored in the memory and the previously stored Haptoglobin level exceeds a threshold limit:
    obtain a supplementary biomarker level of a supplementary biomarker that is distinct from Haptoglobin; and
    carry out a comparison of the obtained supplementary biomarker level with a supplementary biomarker reference limit,
  wherein the health condition of the animal is indicated based on both the comparison of the supplementary biomarker level with the supplementary biomarker reference limit and the comparison of the obtained Haptoglobin level with the Haptoglobin reference limit.

19. The milking arrangement according to claim 18, wherein the control unit is further configured to:
  calculate the Haptoglobin reference limit, based on a value of at least one stored Haptoglobin level.

20. The milking arrangement according to claim 18, wherein the control unit is further configured to:
  take a further milk sample of the animal;
  obtain the supplementary biomarker level from the further milk sample of the animal, of the selected supplementary biomarker; and
  carry out the comparison of the obtained supplementary biomarker level with the supplementary biomarker reference limit,
  wherein the control unit is configured to take the further milk sample from the animal repeatedly as iterative further milk samples, and store the supplementary biomarker level of each one of the iterative further milk samples in the memory of the milking arrangement together with an associated time reference, said control unit further configured to determine a difference between the obtained supplementary biomarker level stored in the memory and a previously stored supplementary biomarker level, and
  wherein the health condition is indicated based on the determined difference.

21. The milking arrangement according to claim 20, wherein the control unit is further configured to:
  calculate the supplementary biomarker reference limit, based on at least one stored supplementary biomarker level.

22. The milking arrangement according to claim 20, wherein the control unit is configured to take the further milk sample of the animal when the predetermined time period has passed a reference point in time.

23. The milking arrangement according to claim 20, wherein the control unit is further configured to, when the obtained Haptoglobin level exceeds the Haptoglobin reference limit:
  take a still further milk sample of the animal;
  select an additional biomarker, distinct from both Haptoglobin and the supplementary biomarker;
  obtain an additional biomarker level from the still further milk sample of the animal, of the selected additional biomarker;
  carry out a comparison of the obtained additional biomarker level with an additional biomarker reference limit, wherein the health condition of the animal is indicated based on the comparison between the additional biomarker level with the additional biomarker reference limit.

24. The milking arrangement according to claim 23, wherein the control unit is configured to select the additional biomarker from any of: BHB, conductivity, and somatic cell count, while being different from the supplementary biomarker.

25. The milking arrangement according to claim 20, wherein the control unit is configured to select the supplementary biomarker from any of: LDH, "Lactate Dehydrogenase", BHB, "Beta-Hydroxybutyrate", conductivity, and somatic cell count.

26. The milking arrangement according to claim 20, wherein the predetermined time period is between 5-10 days, and the control unit is configured to, when the obtained supplementary biomarker level is lower than the supplementary biomarker reference limit while the obtained Haptoglobin level exceeds the Haptoglobin reference limit, indicate the health condition of metritis.

27. The milking arrangement according to claim 20, wherein the predetermined time period is between 11-30 days, and the control unit is configured to, when the obtained supplementary biomarker level is lower than the supplementary biomarker reference limit while the obtained Haptoglobin level exceeds the Haptoglobin reference limit, indicate the health condition of endometritis.

28. The milking arrangement according to claim 20, wherein the control unit is configured to, when the obtained supplementary biomarker level is higher than the supplementary biomarker reference limit while the obtained Haptoglobin level is lower than the Haptoglobin reference limit while being higher than a third Haptoglobin reference limit for at least 30 consecutive days, indicate the health condition of chronic mastitis.

29. The milking arrangement according to claim 18, wherein the predetermined time period is between 5-10 days, and the control unit is configured to, when the obtained Haptoglobin level exceeds the Haptoglobin reference limit, indicate the health condition of the animal to concern metritis.

30. The milking arrangement according to claim 18, wherein the predetermined time period is between 11-30 days, and the control unit is configured to, when the obtained Haptoglobin level exceeds the Haptoglobin reference limit, indicate the health condition of the animal to concern endometritis.

31. The milking arrangement according to claim 18, wherein the predetermined time period is between 40-100 days, and the control unit is configured to, when the obtained Haptoglobin level exceeds the Haptoglobin reference limit, indicate the health condition of the animal to concern lameness.

32. The milking arrangement according to claim 18, wherein the predetermined time period is between 0-30 days, and the control unit is configured to, when the obtained Haptoglobin level exceeds a second Haptoglobin reference limit, which is higher than the Haptoglobin reference limit, indicate the health condition of the animal to concern acute mastitis.

33. The milking arrangement according to claim 18, wherein the control unit is configured to, when the obtained Haptoglobin level is lower than the Haptoglobin reference limit while being higher than a third Haptoglobin reference limit, which is lower than the Haptoglobin reference limit, indicate the health condition of the animal to concern chronic mastitis.

* * * * *